United States Patent [19]

DiRegolo

[11] Patent Number: 4,601,409

[45] Date of Patent: Jul. 22, 1986

[54] LIQUID CHEMICAL DISPENSING SYSTEM

[75] Inventor: Joseph A. DiRegolo, San Leandro, Calif.

[73] Assignee: Tritec Industries, Inc., Mountain View, Calif.

[21] Appl. No.: 672,798

[22] Filed: Nov. 19, 1984

[51] Int. Cl.[4] .......................... G01F 11/00; B67D 1/00

[52] U.S. Cl. .......................................... 222/1; 222/56; 222/67; 222/136; 222/145; 222/204; 141/65; 137/205; 137/413

[58] Field of Search ....................... 222/56, 64, 65, 66, 222/67, 136, 145, 152, 204, 254, 255, 1, 61; 141/65, 66, 67; 137/205, 392, 413

[56] References Cited

U.S. PATENT DOCUMENTS

| | | | |
|---|---|---|---|
| 1,459,962 | 6/1923 | Wheeler | 137/205 |
| 2,294,798 | 9/1942 | Nelson | 222/152 |
| 3,051,192 | 8/1962 | Fagot et al. | 222/56 |
| 4,247,018 | 1/1981 | Credle | 222/64 |
| 4,305,527 | 12/1981 | McMillin et al. | 222/56 |
| 4,377,246 | 3/1983 | McMillin et al. | 222/67 X |
| 4,412,568 | 11/1983 | Hughes | 141/67 |
| 4,483,665 | 11/1984 | Hauser | 417/401 |
| 4,493,435 | 1/1985 | Hartley | 222/136 |
| 4,560,089 | 12/1985 | McMillin et al. | 222/67 X |

FOREIGN PATENT DOCUMENTS

| | | | |
|---|---|---|---|
| 2620117 | 11/1977 | Fed. Rep. of Germany | 222/61 |

*Primary Examiner*—Joseph J. Rolla
*Assistant Examiner*—Edward S. Ammeen
*Attorney, Agent, or Firm*—Thomas E. Schatzel

[57] ABSTRACT

A system for dispensing liquid chemicals, such as photoresist, from containers which includes a valve to govern the flow from the containers, a reservoir to intermediately hold the chemicals prior to pumping, and a level detector to monitor the liquid in the reservoir and to control the valve, and an aspirator to remove air from the reservoir. The aspirator is activated in response to signals from the level detector indicating that the reservoir level is low. The increased suction causes liquid to be drawn from the container into the reservoir. If after a period of time the level detector indicates the reservoir level is still low, the valve will cause liquid to be drawn from a different container. The aspirator is deactivated a period of time after the level detector indicates that the reservoir level is normal.

11 Claims, 1 Drawing Figure

LIQUID CHEMICAL DISPENSING SYSTEM

BACKGROUND OF THE INVENTION

1. Field of the Invention

The present invention relates to systems for dispensing liquid chemicals and, more particularly, to automatic systems for switching from one source container of liquid chemicals to another source container.

2. Description of Prior Art

In the manufacture of integrated microelectronic components, commonly referred to as semiconductor chips, it is imperative to provide carefully controlled processing conditions to maximize the yield of acceptable products. In typical fabrication processes for microelectronic components, several hundred or more individual semiconductor chips may undergo the same manufacturing process at the same time and, accordingly, any processing upset or error can render useless a large number of the products. This is especially true in photolithographic processes where silicon substrates are chemically etched to form the topoqraphical patterns which are essential to operation of the microelectronic components.

In conjunction with chemical etching of semiconductor substrates, it is well-known to coat certain portions of the silicon substrate with a polymeric liquid chemical known as photoresist. Upon exposure to ultraviolet radiation, the photoresist forms a protective layer on the selectively coated portion of the substrate to protect that portion from chemical attack during the subsequent etching process. Such coating of photoresist must be thin but continuous over the area to be protected, otherwise a portion of the coated area will undergo etching and the electronic component will be rendered valueless. One cause of discontinuities in photoresist layers has been traced to air bubbles which are introduced to the process as the photoresist is dispensed. Accordingly, it is important in the fabrication of semiconductor microelectronic components to dispense photoresist in a manner which minimizes the amount of air entrained in the photoresist liquid.

In a typical microelectronic fabrication operation, photoresist is dispensed by pumping from relatively small bottles. This practice relates to the expense, toxicity and "shelf life" of the chemical, as well as to the necessity of maintaining purity of the product and the fact that the amounts of photoresist liquid which are periodically dispensed must be precisely controlled. Because the individual containers for the photoresist liquid are relatively small, it is periodically necessary to replace the containers in the dispensing equipment as they are emptied. Heretofore, the replacement operations have often permitted air to become entrained in the dispensing equipment, especially the pumps. For example, if a source container "runs dry" before it is replaced, air rather than liquid chemical will be drawn into the dispensing system and, subsequently, the air can cause imperfections in the coatings of photoresist upon the semiconductor substrates.

SUMMARY OF INVENTION

A primary object of the present invention is to provide an improved system for dispensing liquid chemicals, such as photoresist, from containers for direct usage in a manufacturing operation for integrated microelectronic circuits.

More specifically, an object of the present invention is to provide an improved system for dispensing liquid chemicals, such as photoresist, which operates to minimize the opportunity of air to be entrained in the dispensing system.

Yet another object of the present invention is to provide an improved system for dispensing liquid chemicals, such as photoresist, where the system operates to automatically switch from one source container for the chemicals to another source container.

Still another object of the present invention is to provide an improved system for dispensing photoresist and similar chemicals which minimizes wastage of the chemicals.

The preferred embodiment of the present invention includes conduit means connecting the two source containers to a controllable valve which selectively blocks the flow of liquid alternatively from the first or second container of the pair, a reservoir means connected in liquid-flow communication with the controllable valve and comprising a container for holding a substantial volume of received liquid, means to pump liquid from the lower region of the reservoir container, level sensing means to monitor the level of liquid within the reservoir container and to provide an output signal whenever the liquid level falls below a predetermined location, and switching means connected to receive the output signals from the level sensing means and mounted to actuate the controllable valve in response to the output signals, thereby to switch liquid-flow communication from one of said containers to the other of said containers. In the preferred embodiment of the system of the invention, an aspirating device comprising a venturi member is connected to the reservoir means to withdraw air from the reservoir container above the level of liquid therein.

Although various modes of operation of the system can be practiced, in the preferred method of operation the output signals from the level sensing means are utilized to actuate the aspirating device to withdraw air from the reservoir means for a first preselected time period if the liquid level within the reservoir means falls below the monitored level. If the liquid level does not rise above the monitored level during the first preselected time period, then the output signals from the level sensing means are utilized to actuate the controllable valve means to switch from a first position, whereat the valve blocks the flow of liquid through the second conduit while permitting flow through the first conduit, to a second position whereat the valve blocks the flow of liquid through the first conduit while permitting flow through the second conduit. In other words, if the reservoir means does not refill during the first time period, the controllable valve will switch from the first container to the second container.

In accordance with the preceding, a primary advantage of the present invention is the provision of an improved system for dispensing liquid chemicals, such as photoresist, from containers for direct usage in a manufacturing operation for integrated microelectronic circuit components.

Another advantage of the present invention is the provision of an improved system for dispensing liquid chemicals, such as photoresist, which operates to minimize the opportunity of air to be entrained in the dispensing system and to minimize wastage of the liquid chemicals.

Yet another advantage of the present invention is the provision of an improved system for dispensing liquid chemicals, such as photoresist, where the system operates to automatically switch from one source container for the chemicals to another, while minimizing the opportunity for air to be entrained in the pumps of the dispensing system.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 is a schematic diagram of liquid chemical dispensing system according to the present invention.

DETAILED DESCRIPTION OF PREFERRED EMBODIMENT

Figure 1:
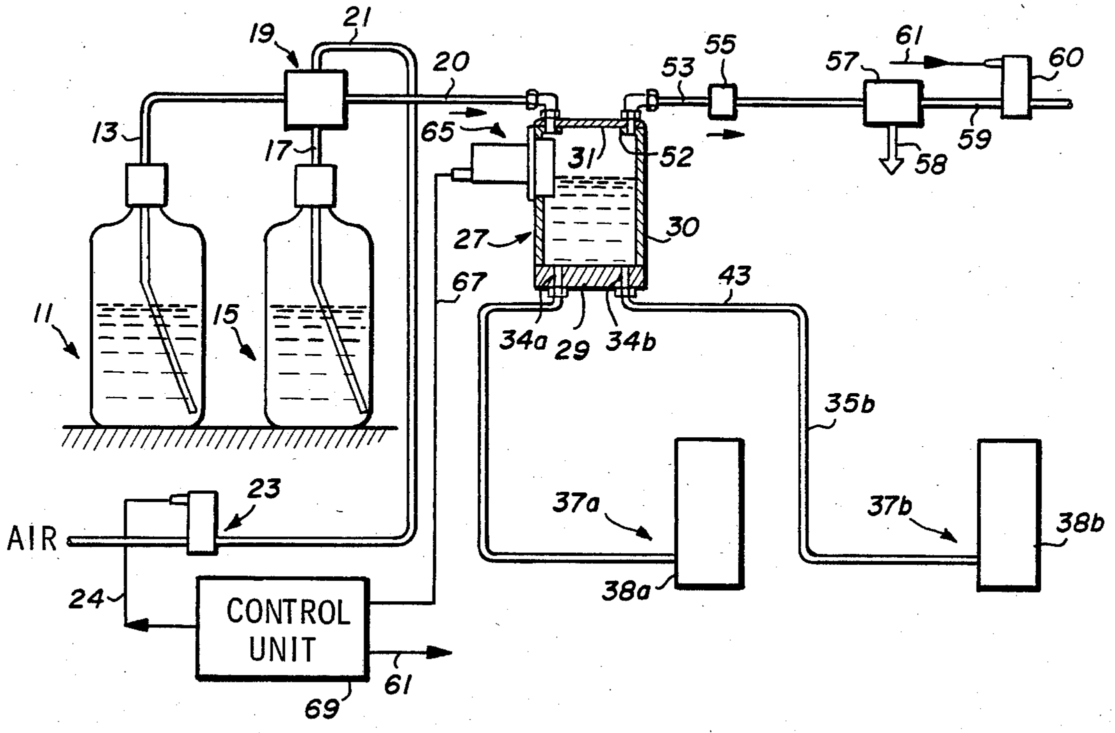

Generally, FIG. 1 shows an improved system for dispensing liquid chemicals, such as photoresist, alternatively from a pair of containers. More particularly, FIG. 1 depicts a system which operates to automatically dispense liquid chemicals from a first container 11 via a first conduit 13 until such time as the first container 11 is empty, and then the system functions to automatically switch to a second container 15 to dispense liquid chemicals therefrom via conduit 17 until such time as the second container 15 is empty. During the period of time that the system is withdrawing liquid chemicals from second container 15, the system operates to block liquid flow through the first conduit 13, so that operating personnel can replenish first container 11 with liquid chemicals. After the second container 15 has been emptied, the system of FIG. 1 will automatically operate to switch from container 15 to container 11 to subsequently withdraw liquid chemicals therefrom while blocking liquid flow through the second conduit 17 so that operating personnel can replenish the second container 15 with liquid chemicals.

In practice of the system of FIG. 1, containers 11 and 15 are conventional bottles, flexible plastic containers, or the like for containing a liquid chemical such as photoresist. Conduit 13 is mounted so that its one end extends into the first container 11 to withdraw liquid from a lower region thereof; the other end of the first conduit 15 is connected to a controllable valve generally designated by the numeral 19. Likewise, the second conduit 17 is mounted so that its one end extends into the second container 15 to withdraw liquid therefrom, and its opposite end is connected in liquid-flow communication with the controllable valve 19. Also connected to the controllable valve 19, in liquid-flow communication therewith, is an outlet conduit 20.

The controllable valve 19 may be understood to comprise a conventional three-way valve which, in a first position, allows liquid to flow from the conduit 13 to the outlet conduit 20 while blocking flow through the second conduit 17. In its second position, the controllable valve 19 blocks flow through the first conduit 13 but permits liquid to flow from the conduit 17 into the outlet conduit 20.

In the preferred embodiment, the valve 19 is pneumatically-controlled. As such, the valve 19 includes a conventional pilot switch, not separately shown in FIG. 1, which is actuated by the flow of compressed air via conduit 21. In turn, the flow of compressed through conduit 21 is controlled by a conventional normally-closed solenoid valve 23 interposed in the conduit 21. The solenoid valve 23 may be understood to require electrical actuation via line 24 to be in an open position, at which time it permits compressed air to flow through conduit 21 to the pilot switch. Typically, the compressed air will be at a pressure of about 50 psi.

The outlet conduit 20 from the controllable valve 19 extends in liquid-flow communication to a reservoir means generally designated by the numeral 27 in FIG. 1. The reservoir means 27 is, in essence, a specially-designed vessel capable of containing a substantial quantity of liquid. (In practice, the reservoir means 27 contains about 300 ml of liquid.) Thus, in the illustrated embodiment, the reservoir means 27 includes a container having a bottom wall 29, an upstanding cylindrical sidewall 30, and a top closure wall 31. Further, apertures 34*a*, and 34*b* are formed through the bottom wall 29 of the reservoir means. Sealably connected into the respective apertures 34*a* and 34*b* are conduits 35*a* and 35*b* which lead from the reservoir 27 to respective pumps 37*a* and 37*b*. (The outlets from the pumps 37*a* and 37*b* are not shown.)

Further in the embodiment shown in FIG. 1, an aperture 52 is formed through the top wall 31 of the reservoir means 27, and a conduit 53 is sealably fitted into the aperture thereby to be in air-flow communication with the interior of the reservoir. Interposed in the conduit 53 is a conventional one-way check valve 55 which operates to permit air to flow from the reservoir 27 while preventing flow in the opposite direction (i.e., into the reservoir). Conduit 53, at its other end, is connected to an aspirating means 57 which can be understood to be a conventional device for creating a reduced pressure in the conduit 53, thereby to cause the withdrawal of air fluids from the reservoir means 27. In the preferred embodiment, the aspirating means 57 comprises a conventional venturi member having a drain 58 and conduit means 59 for receiving compressed air. In the venturi member, the flow of compressed air through the restricted area of the throat will create a region of reduced fluid pressure in accordance with Bernoulli's principle. With the conduit 53 connected in fluidflow communication with the low pressure throat area, suction will be created in the conduit 53 which will draw air, from the reservoir means 27. Typically, the reduced pressure at the throat of the venturi will be about twenty inches of mercury.

In the illustrated system, the flow of compressed air to the aspirating means 57 is controlled by a normally-closed solenoid valve 60 interposed in the conduit 59. The solenoid valve 60 may be understood to be electrically-actuated via line 61 and of the same type as the previously described solenoid valve 23. Also interposed in conduit 53, or within reservoir means 27 itself, is an overflow sensing means, not shown, but which may be embodied as a float switch.

The pumps 37*a* and 37*b* may be understood to be conventional devices for pumping photoresist. A particularly useful and reliable pump for this purpose is disclosed in the U.S. Pat. No. 4,483,665. Such pumps include bodies 38*a* and 38*b*, respectively.

In accordance with the present invention, a level sensing means generally designated 65 is associated with the reservoir means 27 to monitor the liquid level within the container defined by the walls 29 and 30 and to provide an output signal whenever the monitored liquid level falls below a predetermined location. In the preferred embodiment, the level sensing means is a proximity sensor of the electrostatic capacitive type which is mounted to the exterior of the container body 30 and operable to detect the presence (i.e., proximity) or absence of liquid within the container body without the need for forming apertures through the wall of the container body. The electrical output signals from the level sensor 65 are carried by output conductor 67 to a control unit means 69 which is utilized to coordinate operation of the system of FIG. 1.

Operation of the system of FIG. 1 can now be readily understood. Initially, the system should be assumed to be in a condition where liquid is being withdrawn from container 11 and passed through valve 19 into reservoir means 27 to fill the same to a level above the preselected location of the level sensor means 65 and concurrently, at least one of the pumps 37*a* and 37*b* is operating to withdraw liquid from the reservoir means 27. During this period, the pumping creates reduced pressure within the reservoir means which, in turn, draws liquid from the container 11 to keep the reservoir filled to a level above that which triggers operation of the level sensing means 65. (It should be remembered that the one-way check valve 55 operates to prevent the flow of air into the reservoir means 27 through the conduit 53.)

During operation as described in the preceding paragraph, there is no output signal from the level sensing means 65. Such conditions will continue, however, only until such time as container 11 is essentially depleted of its contents or, for some other reason, liquid no longer flows from the container 11. When that happens, the liquid level in reservoir means 27 will fall below the location monitored by the sensing means 65. When that level is passed, the sensing means 65 will provide an output signal on conductor 67. In response, the control unit 69 will operate the normally-closed solenoid valve 60. When the valve 60 is opened, compressed air will flow to the aspirating means 57 to cause a pressure drop which will be communicated to the reservoir means 27 via the conduit 53. This reduced pressure will be communicated, via the reservior means 27, to the conduit 20 and then to conduit 13. Accordingly, if the container 11 contains ample liquid, and there is merely a minor blockage in liquid flow from the container 11, the supplemental suction provided by the aspirating means 55 will normally cause liquid to begin flowing again to the reservoir means 27. During the period that the reservoir means is refilling, the control unit 69 will operate the aspirating means 57 to continue to draw air from the reservoir means. After some time of operation under such conditions, the reservoir means 27 will be refilled to above the level monitored by the level sensing means 65 and the output signal from the level sensing means will again fall to zero. In the preferred operating mode, the control unit 69 will operate the solenoid valve 60 to remain open for a predetermined time period, say about three seconds, after the output signal from the level sensing means goes to zero; this is to assure that the aspirating means 57 continues to operate to draw the liquid level within the reservoir means 27 substantially above the level monitored by the level sensing means 65, thereby to obviate the need to frequently activate the aspirating means 57.

At this juncture, it may be appreciated that the aspirating means 57 provides a priming function with regard to the reservoir means 27. That is, the aspirating means draws liquid into the reservoir means. Accordingly, in practice, it is desirable to provide a manual override of the control program such that the aspirating means 57 may be manually actuated as desired to prime the reservoir means 27.

Should liquid fill the reservoir means 27 and be drawn through the conduit 53, such a condition will be sensed by the overflow sensing means. During overflow conditions, output signals from the overflow sensing means can be utilized to deactivate the solenoid valve 60 to, in turn, deactivate the aspirating means 57.

After some predetermined time period, if liquid does not fill the reservoir means 27 above the level monitored by the level sensing means 65, the output signal from the level sensing means will cause the control unit 69 to open the normally-closed solenoid valve 23 and, hence, to allow compressed air to flow through the conduit 21 to actuate the pilot switch associated with the controllable valve 19. Upon actuation of the pilot switch, the valve 14 will move from its first position to the second position. In the second position, the controllable valve 19 will block the flow of liquid through the first conduit 13 while permitting the flow of liquid through the second conduit 17 into the outlet conduit 20.

It may be appreciated that the controllable valve means 19, because it is air controlled, does not cause heating of the liquid passing through it and, hence, does not effect the characteristics of the dispensed chemicals as may occur, for instance, with electrically-actuated valves.

After the controllable valve 19 has effectuated the flow communication change from container 11 to container 15, the level sensing means 65 will continue to provide an output signal indicating a low level of liquid within the reservoir means 27 until such time as the reservoir refills. Accordingly, during this period, the control unit 69 will hold the normally-closed solenoid valve 60 open, operating the aspirating means 57 to provide a negative pressure within the reservoir means 27 to draw liquid into the reservoir from the second container 15. After the reservoir means has filled to a level above that monitored by the sensing means 27, the output from the sensing means will terminate. Thereafter, the aspirating means 57 will continue to provide a negative pressure for some time period determined by the control unit 69 or until an overflow condition is indicated.

When the system begins withdrawing liquid from the second container 15, it is convenient to provide an indication of this condition and, consequently, the fact that the first container 11 requires refilling. Such an indication can readily be provided at the control unit 69 by an audible or visual alarm. Thus, during the period that liquid is being withdrawn from the second container 15, operating personnel will have ample opportunity to refill the first container 11.

The operation of the system while liquid is being withdrawn from the second container is essentially the same as the mode of operation previously described for operation while liquid is bein withdrawn from the first container. That is, when the liquid level in the reservoir means 27 first falls below the monitored level, the control unit 69 will first actuate the aspirating means to produce a reduced pressure in the reservoir means to overcome any temporary blockage of flow from the second container 15. If the flow stoppage proves to be only temporary, the system will continue to withdraw liquid from the second container 15. However, if the stoppage of flow from the second container persists for more than a short period of time, the control unit 69 will cause actuation of the controllable valve 19 to switch from the second container 15 to the first container 11. Upon such switching, an indicator alarm or warning will be provided to signal the operating personnel that the second container 15 requires refilling.

At this juncture, it can be appreciated that the reservoir means 27 operates effectively as an intermediate holding vessel between the source containers and the dispensing pumps to prevent air from entering the dispensing pumps. Such operation is especially advantageous during the time that the system is switching from one of the liquid-holding containers 11 to 15 to the other.

Although the present invention has been described with particular reference to the illustrated preferred embodiments, it is to be understood that such disclosure is not to be interpreted as limiting. Various other alterations, modifications and embodiments will no doubt become apparent to those skilled in the art after having read the preceding disclosure. Accordingly, it is intended that the appended claims be interpreted as covering all such alteration, modifications and embodiments as fall within the true spirit and scope of the present invention.

I claim:

1. An improved system for dispensing liquid chemicals, such as photoresist, from a pair of containers comprising:

a. first conduit means mounted in liquid-flow communication with a first container of the pair for carrying liquid therefrom;

b. second conduit means mounted in liquid-flow communication with a second container of the pair for carrying liquid therefrom;

c. controllable valve means connected in liquid-flow communication with the first and second conduit means to selectively, in a first position, block the flow of liquid through the second conduit means while permitting flow through the first conduit means and, in a second position, block the flow of liquid through the first conduit means while permitting flow through the second conduit means;

d. reservoir means connected in liquid-flow communication with the controllable valve means to receive liquid from the first and second conduit means via the controllable valve means, the reservoir means including a container for holding a volume of received liquid;

e. pump means connected in liquid-flow communication with said container for withdrawing liquid therefrom;

f. level sensing means mounted to monitor the level of liquid within said container and to provide an output signal indicative of whether the liquid level has fallen below a predetermined location;

g. switching means connected to receive the output signals from the level sensing means and mounted to actuate the controllable valve means in response to such signals to switch from flow communications with one of the containers of the pair to the other; and h. air withdrawal means connected to the reservoir means to withdraw air from the reservoir means above the level of liquid therein.

2. A system according to claim 1 wherein the pump means is connected to withdraw liquid from a lower region of the reservoir means.

3. A system for dispensing liquid chemicals according to claim 1 wherein the switching means is operable to actuate the controllable valve means from the first position to the second position upon receiving a signal from the level sensing means indicating that the liquid level within said container has fallen below the predetermined location.

4. A system for dispensing liquid chemicals according to claim 1 wherein the switching means associated with the controllable valve means comprises an air-actuated pilot switch and conduit means to direct compressed air to said pilot switch to actuate the controllable valve means between the first and second positions.

5. A system for dispensing liquid chemicals according to claim 4 wherein said means to direct compressed air to said pilot switch is connected to receive the output signals from the level sensing means and is operative to block the flow of compressed air to said pilot valve in the absence of such signals from said level sensing means.

6. A system for dispensing liquid chemicals according to claim 1 wherein the air withdrawal means comprises an aspirating means.

7. A system for dispensing liquid chemicals according to claim 6 wherein said aspirating means comprises:

a. a venturi member, b. means connected to said venturi member for selectively directing compressed air through said venturi member to create an area of reduced pressure within the throat of said venturi member, and c. means connecting said area reduced pressure in fluid flow communication with the reservoir means, whereby air is withdrawn from the reservoir means upon the creation of a reduced pressure within said venturi member.

8. A system for dispensing liquid chemicals according to claim 7 further including a one-way check valve interposed at said means connecting said area of reduced pressure with the reservoir means to prevent air-flow into said container.

9. A system for dispensing liquid chemicals according to claim 7 including overflow sensing means operably connected to the reservoir means to detect when liquid fills the reservoir means.

10. A method of operation of a system for dispensing liquid chemicals such as photoresist, from a pair of containers, which system includes:

a. first conduit means mounted in liquid-flow communication with a first container of the pair for carrying liquid therefrom;

b. second conduit means mounted in liquid-flow communication with a second container of the pair for carrying liquid therefrom;

c. controllable valve means connected in liquid-flow communication with the first and second conduit means to selectively, in a first position, block the flow of liquid through the second conduit means while permitting flow through the first conduit means and, in a second position, block the flow of liquid through the first conduit means while permitting flow through the second conduit means;

d. reservoir means connected in liquid-flow communication with the controllable valve means to receive liquid from the first and second conduit means via the controllable valve means, said reservoir means including a container for holding a volume of received liquid;

e. pump means connected in liquid-flow communication with said container for withdrawing liquid therefrom;

f. level sensing means mounted to monitor the level of liquid within said container and to provide an output signal indicative of whether the liquid level has fallen below a predetermined location; and g. switching means connected to receive the output signals from the level sensing means and mounted to actuate the controllable valve means in response to such signals to switch from flow communication with one of the containers of the pair to the other, the method of operating the system comprising the steps of:

i. when the liquid level within said reservoir means fall below the predetermined level monitored by the level sensing means, utilizing the output from the level sensing means to cause actuation of means to withdraw air from the reservoir means above the level of liquid therein for a first preselected period of time;

ii. when the level of liquid within the reservoir means does not rise above the level monitored by the level sensing means within a second predetermined period of time which begins concurrently with the first predetermined period of time but is shorter than said first period, utilizing the output signals from the level sensing means to cause actuation of said controllable valve means to move from said first position to said second position.

11. A method of operation of a system for dispensing liquid chemicals according to claim 10 further including the steps of:

sensing the condition of the reservoir means being filled with liquid and, upon such an occurrence, interrupting the operation of the means to withdraw air from the reservoir means.

* * * * *